(12) United States Patent
Hori

(10) Patent No.: US 6,208,916 B1
(45) Date of Patent: Mar. 27, 2001

(54) AUTOMATIC GUIDED VEHICLE SYSTEM

(75) Inventor: Kikuo Hori, Kyoto (JP)

(73) Assignee: Murata Kikai Kabushiki Kaisha, Kyoto (JP)

( * ) Notice: Subject to any disclaimer, the term of this patent is extended or adjusted under 35 U.S.C. 154(b) by 0 days.

(21) Appl. No.: 09/294,141

(22) Filed: Apr. 20, 1999

(30) Foreign Application Priority Data

Aug. 6, 1998 (JP) .................................................. 10-236572

(51) Int. Cl.[7] .................................................. G05D 1/02
(52) U.S. Cl. .............................. 701/28; 701/25; 180/169
(58) Field of Search .............................. 701/23, 25, 28; 180/167, 168, 169; 318/587, 568.16

(56) References Cited

U.S. PATENT DOCUMENTS

| | | | |
|---|---|---|---|
| 4,811,228 | * | 3/1989 | Hyyppa ................................... 701/25 |
| 5,187,662 | * | 2/1993 | Kamimura et al. ..................... 701/23 |
| 5,367,458 | * | 11/1994 | Roberts et al. ......................... 701/25 |
| 6,012,003 | * | 1/2000 | Angstrom ............................... 701/28 |

FOREIGN PATENT DOCUMENTS 8-152323 * 6/1996 (JP) .

* cited by examiner

*Primary Examiner*—Michael J. Zanelli
(74) *Attorney, Agent, or Firm*—Armstrong Westerman Hattori McLeland & Naughton, LLP

(57) ABSTRACT

A laser scanner recognizes reflectors arranged along a travelling path. A reflector having an angle or a distance falling within an allowable range relative to the last specified reflector is determined to be the same as the previous specified reflector. Based on the locational relationship between such reflectors and those having an angle or a distance outside the allowable range, the reflectors are specified by referencing a reflector map. The reflectors can be specified without assuming the present position of an automatic guided vehicle.

3 Claims, 7 Drawing Sheets

○ : 16 ; REFLECTOR
22 ; TRAVELLING PATH

AUTOMATIC GUIDED VEHICLE SYSTEM

FIELD OF THE INVENTION

The present invention relates to a navigating system for an automatic guided vehicle, and in particular, to the specification of a reflector without temporarily determining the present position of the automatic guided vehicle.

BACKGROUND OF THE INVENTION

In the prior art, there is a system in which a plurality of reflectors are disposed along the travelling path, and the reflectors are recognized by means of a laser scanner on an automatic guided vehicle to calculate their present position. When three reflectors can be recognized, the present position can be calculated using the principle of triangulation, therefore, the problem with this approach is that concerning whether such recognized reflector is to be specified which of the reflectors on the reflector map. In this case, this problem can be easily solved by assigning identification data such as bar codes to the reflectors, however, such reflectors are expensive and require much time to install. Therefore, in general, the reflectors must be identical.

In order to specify a reflector without assigning identification data to the reflector itself, the start position of an automatic guided vehicle is input to the automatic guided vehicle. First, presuming that the automatic guided vehicle starts from a known position, the recognized reflector is specified at the starting time. In subsequent recognition, the present position is assumed based on the previous recognized position, and to specify the reflectors, the laser scanner is assumed to have recognized those reflectors that can be recognized at the present position. However, when using this technique, if a reflector is incorrectly recognized, it becomes impossible to recognize the exact position of the automatic guided vehicle, thus making it uncontrollable.

It is an object of the present invention to specify reflectors without temporarily determining the present position of the automatic guided vehicle.

It is an additional object of the present invention to enable even newly appeared reflectors to be specified.

It is an additional object of the present invention to have a capability of determining the velocity and angular velocity of the automatic guided vehicle, as well as its position and orientation.

SUMMARY OF THE INVENTION

The present invention is an automatic guided vehicle system characterized by comprising a large number of reflectors arranged along a travelling path, a laser scanner provided in an automatic guided vehicle to determine the orientation of each reflector by means of periodic scanning, a reflector map, a means for storing the results of the specification of reflectors based on the previous scanning, a means for specifying reflectors recognized during the present scanning by determining a reflector located within a predetermined angle relative to the results of the previous recognition to be the same as the previous recognized reflector, and a means for determining the present position of the automatic guided vehicle based on the specified reflectors.

Preferably, the laser scanner determines the orientation of and the distance to the reflector, and the specifying means is configured to specify a newly appeared reflector using the reflector map and the distance relationship between the newly appeared reflector and the specified reflectors.

In addition, preferably, the velocity and angular velocity of the automatic guided vehicle are determined from at least three specified reflectors, and the velocities and angular velocities determined from a previously recognized position until the present time are integrated to determine the present position and orientation.

According to the present invention, the results of the specification of reflectors based on the previous scanning are stored, and reflectors recognized by the present scanning are specified by determining a reflector located within a predetermined angle relative to the results of the previous recognition to be the same as the previous recognized reflector. Preferably, the preceding scanning is used as the previous scanning. The present invention compares the previous recognized value with the present recognized values by means of the laser scanner, and to specify reflectors, treats similar recognized values as the same reflectors, thereby enabling the reflectors to be specified very promptly and easily. In this way, reflectors can be accurately specified.

The present invention also specifies a newly appeared reflector by using the distance relationship between the newly appeared reflector and the specified reflectors, and referencing the reflector map. This configuration enables the newly appeared reflector to be specified without temporarily determined the present position of the automatic guided vehicle.

Furthermore, the present invention uses the results of the recognition of three reflectors to determine the velocity and angular velocity of the automatic guided vehicle in order to determine its present position and orientation. Thus, compared to the determination of the present position and orientation based on the assumption that the automatic guided vehicle is stationary, this configuration can improve recognition accuracy, and in addition, even if a velocity sensor or an angular velocity sensor is provided on the automatic guided vehicle, the velocity or angular velocity can be determined independently of such sensors.

DETAILED DESCRIPTION OF THE PREFERRED EMBODIMENTS

Figure 1:
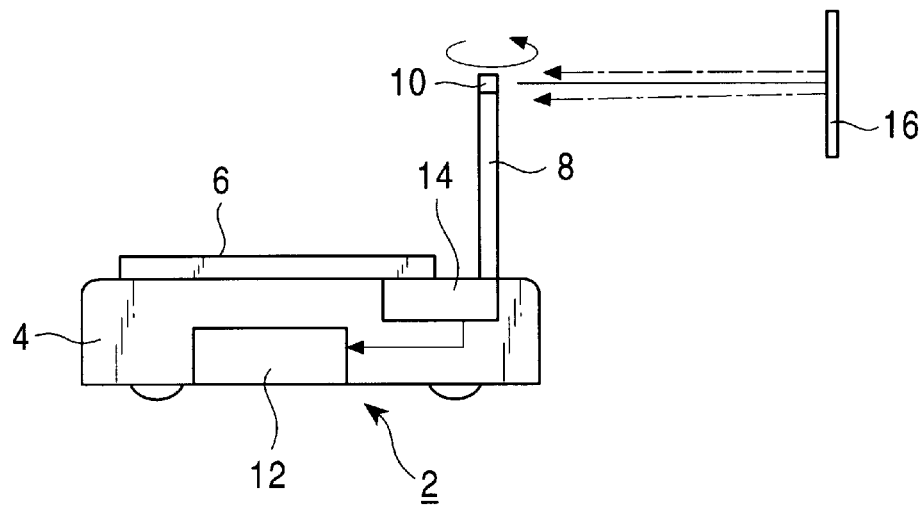
FIG. 1 is a side view of an automatic guided vehicle according to an embodiment of the present invention.

FIGS. 1 to 6 show an embodiment of the present invention. FIG. 1 shows the structure of an automatic guided vehicle 2 wherein 4 is a vehicle body, 6 is a lifter for elevating and lowering an article placed thereon, 8 is a frame on which a laser scanner 10 is placed, 12 is a travel control section, and 14 is a present position recognizing section. The laser scanner rotates at, for example, 10 Hz and detects light reflected from a reflector 16 mounted on a wall in a factory in order to determine the distance to and orientation of the reflector 16. The angular resolution of the reflector 16 is 0.1 degrees or less, and the distance resolution is about 1 meter.

Figure 2:
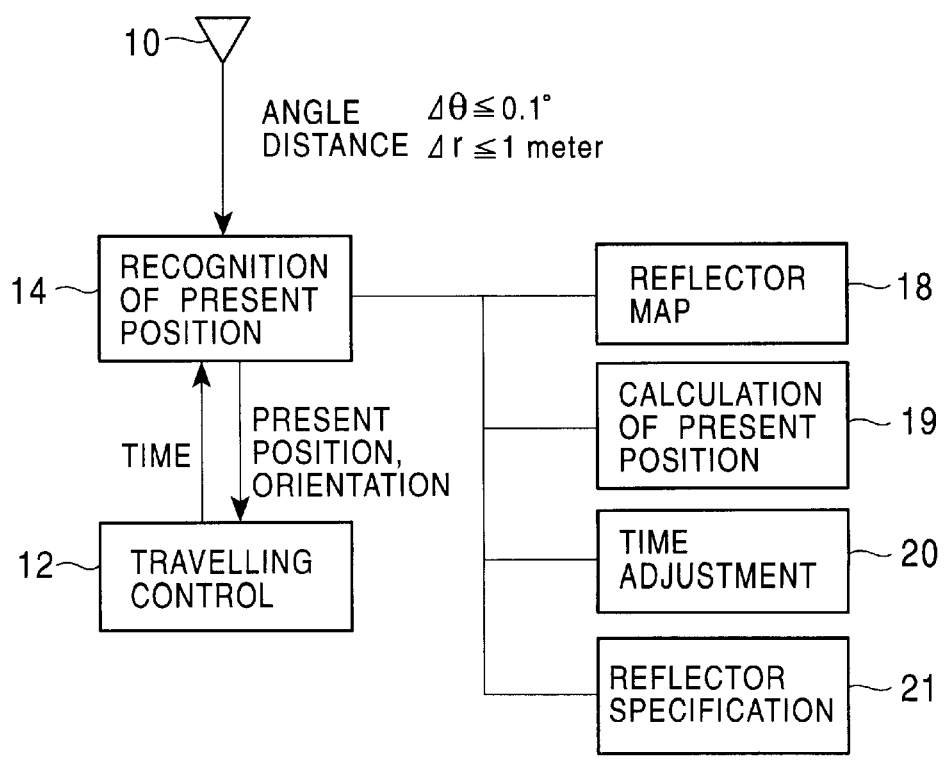
FIG. 2 is a block diagram showing a control system for an automatic guided vehicle according to the embodiment.

FIG. 2 shows a control system for the automatic guided vehicle 2, wherein a present position recognizing section 14 is provided with information from the laser scanner 10 on the angle of a recognized reflector and its distance, and calculate the present position and orientation of the automatic guided vehicle 2 by assuming that the automatic guided vehicle 2 is stationary when the present position recognizing section 14 is activated. In addition, after beginning its autonomous travelling, the present position recognizing section 14 stores the previous determined position and orientation of the automatic guided vehicle 2 and uses the information from the laser scanner 10 on the angle of and distance to the reflector to determine the velocity and angular velocity of the automatic guided vehicle 2, and in this way, the present position recognizing section 14 integrates (accumulates) velocities and angular velocities from the previous recognition point to the present time, thereby determining the present position and the orientation of the automatic guided vehicle. As subsystems for the present position recognizing section 14 include a reflector map 18 that stores the positions of reflectors along the travelling path, a present position calculation section 19 for calculating the present position based on the data in the reflector map 18 and the data in the laser scanner 10, a time adjustment processing section 20 for adjusting its time to the time at the travel control section 12 and translates the time counted by a timer for the present position recognizing section 19 into the time counted by a timer for the travel control section 12, and a reflector specification processing section 21 for specifying which reflector on the reflector map 18 a reflector recognized by the laser scanner 10 is.

[Reflector Specification and Position Recognition upon start-up]

Figure 3:
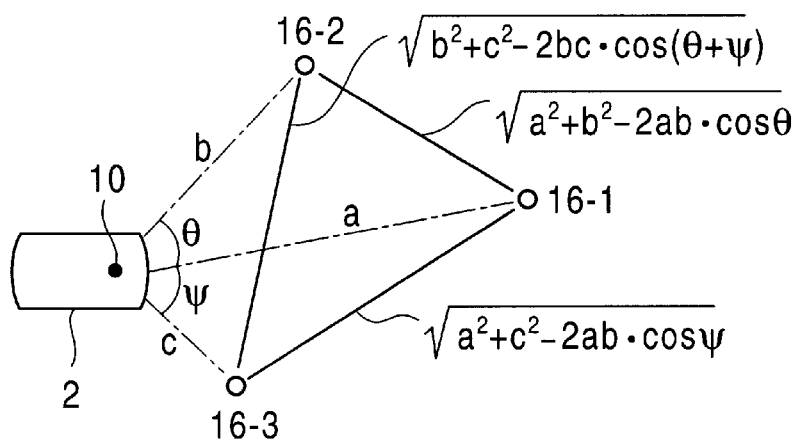
FIG. 3 is a characteristic diagram showing the specification of reflectors at their initial positions according to the embodiment.

FIGS. 3 to 6 show the specification of the reflector and the recognition of the position and orientation of the automatic guided vehicle 2 upon start-up. During this process, the automatic guided vehicle 2 is considered to be stopped. FIG. 3 shows the temporary specification of three reflectors 16-1 to 16-3 that are recognized in this order. If the distance to the first reflector 16-1 is defined as (a), the distance to the second reflector 16-2 is defined as (b), and the angle between the first and second reflectors 16-1 and 16-2 is defined as θ, the distance between the first and the second reflectors 16-1 and 16-2 can be determined using (a) and (b) and the angle θ based on the cosine theorem. Since the resolution for distances (a) and (b) is about 1 meter, the distance resolution between the two reflectors 16-1 and 16-2 is about 1.4 meters. When a third reflector 16-3 is then recognized, the length of each side of the triangle formed by the three reflectors 16-1 to 16-3 is calculated so as to define the shape of this triangle.

Figure 4:
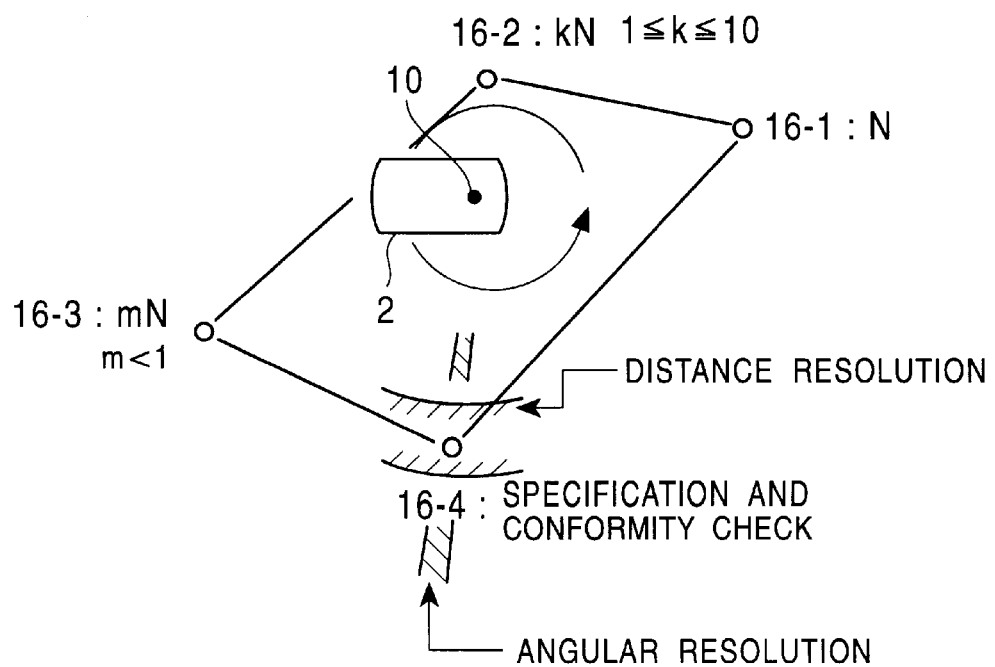
FIG. 4 is a characteristic diagram showing the specification of reflectors at their initial positions according to the embodiment.

FIG. 4 shows a recognition algorithm for specifying the reflectors and recognizing the present position of the automatic guided vehicle 2 in the case where, for example, 4 reflectors are recognized. For example, N reflectors are assumed to exist along the travelling path. Since the initial position of the automatic guided vehicle 2 is not assumed, when the first reflector 16-1 is recognized, there are N hypotheses for specifying the reflectors. Next, the second reflector 16-2 is recognized, and then, the second reflector 16-2 must exist at a predetermined distance from the first reflector 16-1, and the distance resolution is about 1.4 meters. The reflectors are, for example, arranged at an average interval of 10 meters, and the standard deviation of the distance between the reflectors is 5 meters, and the reflectors are presumably distributed uniformly within the range of the standard deviation. If the distance between the first and second reflectors can be recognized with an accuracy corresponding to 1.4 meters, candidates for the second reflector can be selected from those arranged adjacent to the first reflector at a probability of one in seven. When the second reflector is recognized, the number of candidates for this reflector (the number of hypotheses for the possible combinations of reflectors) is about kN ways, wherein k is between 1 and 10 ($1 \leq k \leq 10$) and wherein k is in fact much closer to 1.

Next, the third reflector 16-3 is recognized, and then, the triangle composed of the three reflectors 16-1 to 16-3 must coincide with any one of the triangles on the reflector map 18. At this point, the combinations of candidates for the three reflectors decrease down to mN ways (m<1), so the number of candidates substantially decreases. Thus, with respect to the candidates of mN ways, the present position of the automatic guided vehicle 2 is determined based on the principles of triangulation. In this respect, information on the angle of the three reflectors enables the position and orientation of the automatic guided vehicle 2 to be determined, as is well known. With respect to the present position of the automatic guided vehicle obtained for the mN ways, the distance between the three reflectors 16-1 to 163 is calculated and compared with the recognition value measured by the laser scanner 10, and further proceed the conformity check, and the hypothesis for specifying the three reflectors is further narrowed.

For example, in the case where there is a small total number of reflectors, or in the case where an approximate value of the initial position is input to the automatic guided vehicle 2 (the block number when the travelling path is divided into about 10 blocks, for example), or in the case where additional information on whether each reflector is seen on the right side in front of the travelling path or on the left side is input, the three reflectors can be specified rather accurately at this time. Assuming that the distance resolution between the reflectors is about 1.4 meters and the standard deviation of the interval between the reflectors is about 5 meters, the value for k is, for example, slightly larger than 1 at the time when the second reflector is recognized, and the value of m is 1 or less at the time when the third reflector is recognized, and in addition, when the distance between the automatic guided vehicle 2 and each reflector is checked after the calculation of the present position, the value for m becomes much smaller than 1. Here, if there is a general data on the initial position of the automatic guided vehicle 2 or on additional data such as discrimination of whether each reflector is seen on the right or left side of the travelling path, the value for m is sufficiently decrease, and in a small scale automatic guided vehicle system, three reflectors can be almost specified on the map 18.

When the number of reflectors is increased by about 30%, it is possible to change the condition wherein three reflectors can be recognized into a conditon wherein four or more reflectors can be recognized. In the case where the fourth reflector is recognized, it is possible to first check the conformity of previous recognized reflectors for whether was correct or not with respect to angular resolution. As described above, the angular resolution is 0.1 degree or less, and the probability that the fourth reflector accidentally would be found in this range is 1/1000 or less, and its conformity can be checked with a high level of certainty. The interval resolution for the fourth reflector is about 1 meter, as mentioned above, thereby making it possible to further check conformity. At the point when the fourth reflector is recognized, the reflector can be detected almost certainly from a practical standpoint.

Figure 5:
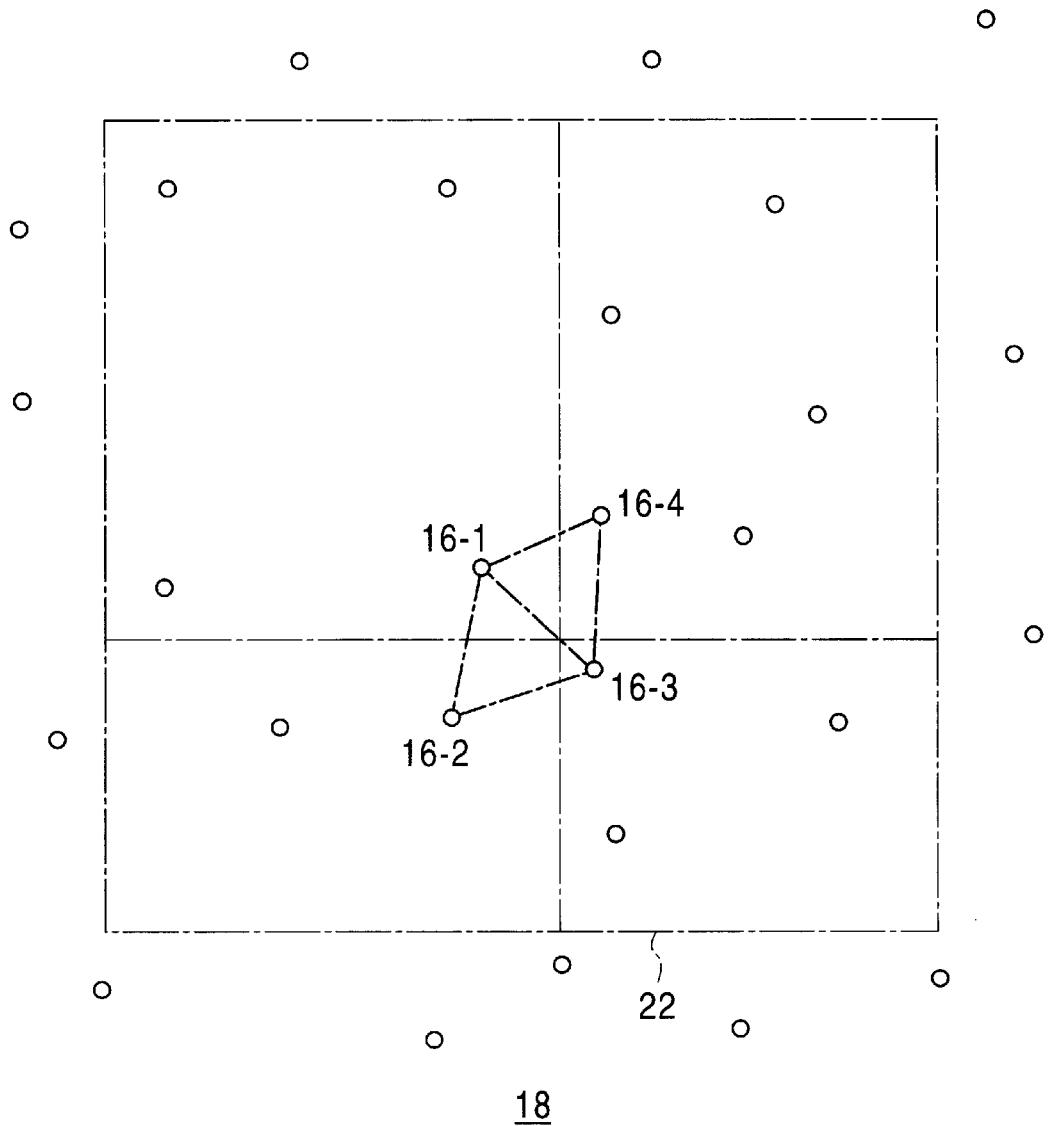
FIG. 5 shows the arrangement of reflectors according to the embodiment.
Figure 6:
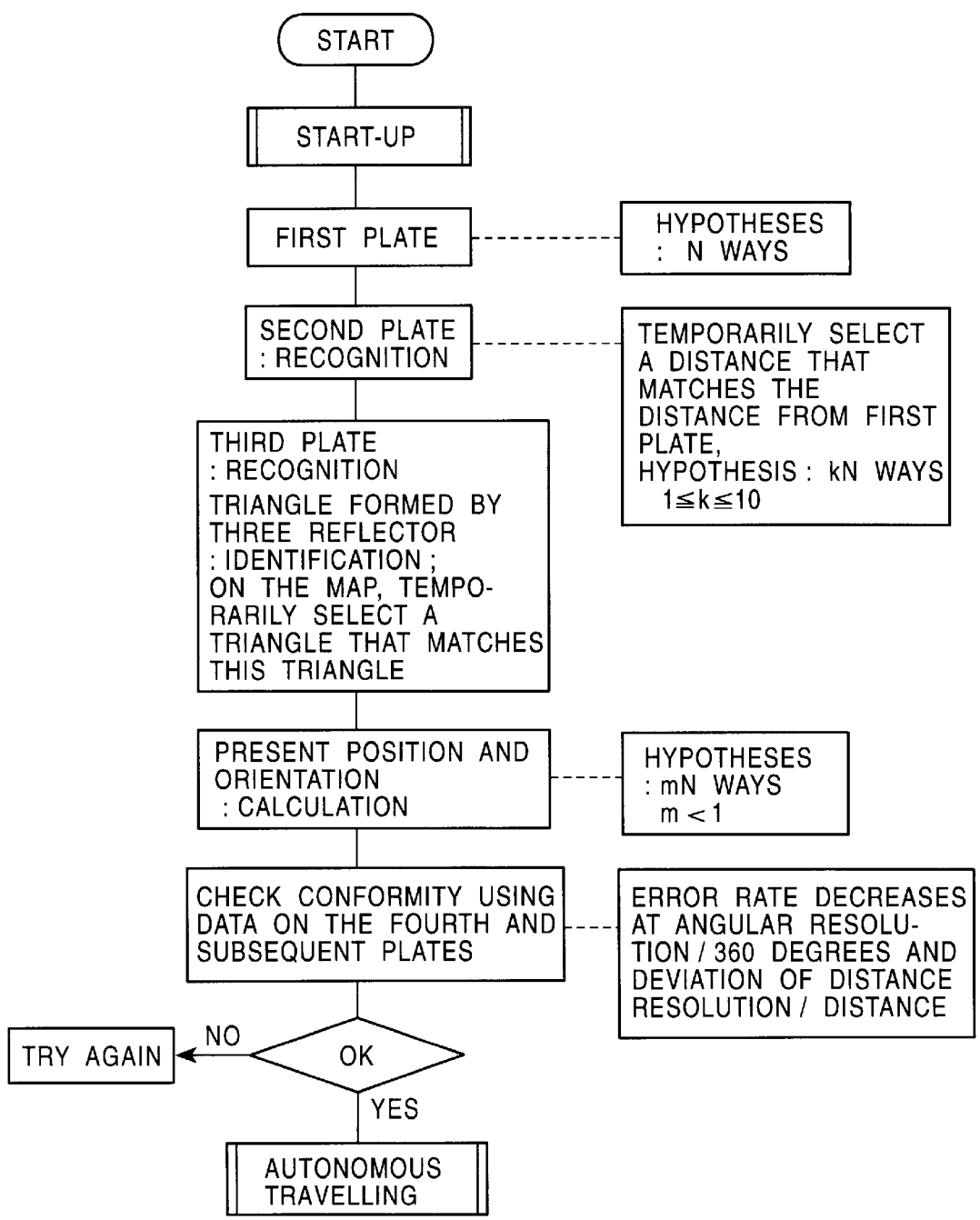
FIG. 6 is a flow chart demonstrating the recognition process for the initial positions.

FIGS. 5 and 6 show a process for recognizing the present position of the automatic guided vehicle in the embodiment. FIG. 5 shows the travelling path and the disposition of the reflector (indicated by a circle ○). For example, at the time when three reflectors are recognized, the triangle formed by these reflectors almost cinides with the reflectors 16-1 to 16-3 in FIG. 5. Another triangle nearly identical to the triangle does not exist in FIG. 5. When the fourth reflector is added, a quadrilateral identical to that formed by these four points does not exist in FIG. 5. Thus, if there is information concerning the distance between each of these reflectors and the laser scanner 10, using three or more reflectors, it is clear that the reflector can be almost specified.

FIG. 6 shows a process for specifying a reflector. Let us assume that the automatic guided vehicle 2 can be started up at an arbitrary position along the travelling path, or that a plurality of positions at which four or more reflectors can be recognized are provided along the travelling path. And Let us further assume that the automatic guided vehicle 2 is started up by either positions mentioned above. At the time when the first reflector is recognized, assuming that the total number of reflectors 16 residing on the travelling path is N, the hypotheses concerning specification of the reflectors are N ways. Next, when the second reflector is recognized, the distance between the first and second reflectors that substantially coincides with the distance obtained by the technique shown in FIG. 3 is selected. At this time, the hypotheses concerning combinations of the first and second reflectors are kN ways, where k is between 1 and 10 but actually substantially closer to 1. Consequently, when the third reflector is recognized, the shape of the triangle formed by these three reflectors is defined, and only triangles having largely the same shape will remain as candidates for determining the reflectors based on the reflector map of FIG. 5. As a result, the range of hypotheses concerning specification of the reflectors are further limited.

Thus, the hypotheses concerning specification of the reflectors are limited to an extent such that calculation is not made complicated, and the present position and orientation of the automatic guided vehicle 2 is calculated with respect to the remaining hypotheses. For example, if the hypotheses of 10 ways still remain, 10 possible combinations are obtained for the present position and orientation of the automatic guided vehicle. If necessary, the distance measured between the laser scanner 10 and each reflector is compared with a calculated value of the distance obtained by each hypotheses, and unreasonable hypotheses are eliminated. Therefore, at this time, there are mN possible solutions for the present position and orientation of the automatic guided vehicle, where m is, for example, a number less or equal to 1.

Here, the fourth and subsequent reflectors are further recognized, and the conformity of hypotheses of mN ways is checked from the recognized angle and distance. The error rate is roughly obtained by multiplying the ratio of the angle resolution of the laser scanner 10 to 360 degrees by the ratio of the distance resolution of the laser scanner 10 to the standard deviation of the interval between the reflectors, and this value is sufficiently smaller than 1/1000. Therefore, when four reflectors can be recognized, the error rate for identifying the recognized reflectors is 1/1000 or less. Assuming that the fifth and subsequent reflectors can be recognized, the conformity is further checked, for example, by whether the error obtained by the least squares method for the present position obtained from the angle and distance with respect to five reflectors is within a prespecified range or is not checked. In the case where the conformity is not sufficient, another attempt is made after the position of the automatic guided vehicle changes. If conformity is checked successfully, the automatic guided vehicle then goes to autonomous travelling. In autonomous travelling, the present position thus obtained becomes the initial position, the reflector thus specified becomes the first observed reflector, and subsequently, the reflector specification is repeated based on this information. In other words, the laser scanner 10 performs scanning at a frequency of about 10 Hz, and because the distance traveled by the automatic guided vehicle 2 in the period between scanning is substantially less than 1 meter, it is as if each reflector were observed consecutively. As a result, with respect to combinations of the previously recognized reflectors, in the next recognition, a reflector within a prespecified angle and distance from previously measured angle and distance values is specified as the same reflector as the previous one. If there is a new reflector, it is sought to be identified by referring to the reflector map 18. When a reflector is thus identified, the present position thereof is recognized based on the identification.

[Autonomous travelling]

Once the initial position and orientation of the automatic guided vehicle 2 have been determined using the processing and configuration in FIGS. 1 to 6, the automatic guided vehicle 2 starts running and then switches to autonomous travelling. During the autonomous travelling process, if a problem occurs in the recognition of the present position, the processing in FIGS. 3 to 6 is repeated to measure the initial position again.

Since it is well known that the present position and orientation of the automatic guided vehicle 2 can be recognized by specifying three reflectors, the point of autonomous travelling is the specification of the reflectors.

Figure 7:
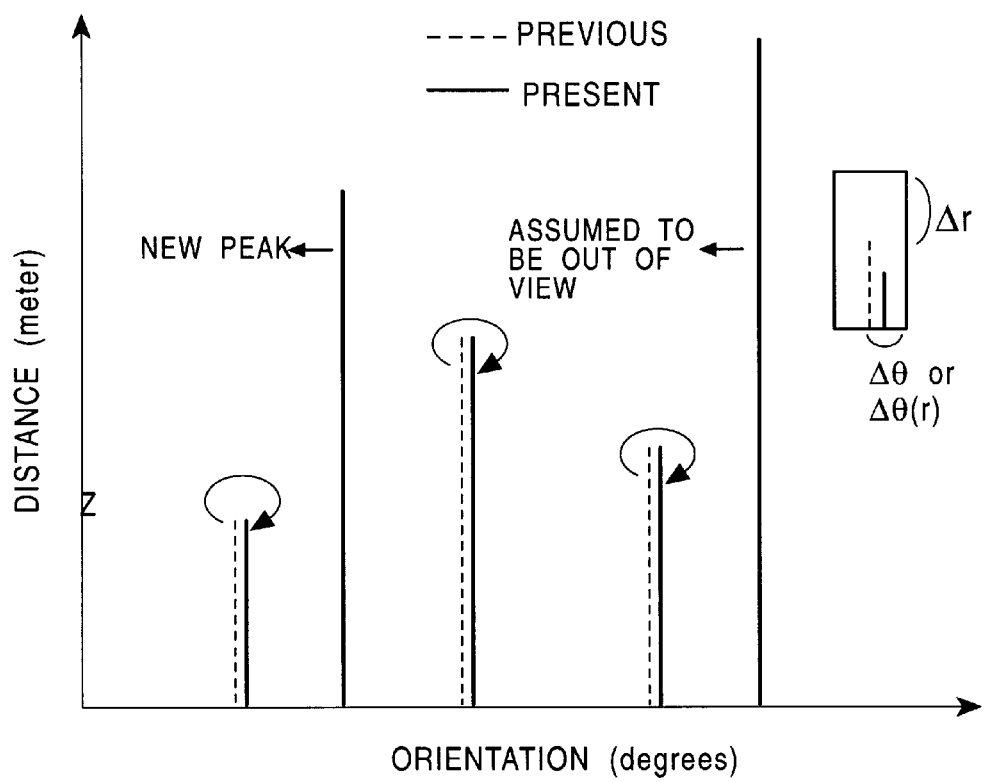
FIG. 7 is a characteristic diagram showing the specification of reflectors during the autonomous travelling process according to the embodiment.

FIG. 7 shows a method for specifying reflectors wherein the broken lines show the orientation of and distance to the last recognized reflector and wherein the solid lines show the distance to and orientation of the present recognized reflector.

The results of the last recognition are not necessarily used and the results of the recognitions before last can be used instead. The results of the last recognition are stored in a reflector specification processing section 21. Since the laser scanner 10 executes scanning at, for example, 10 Hz and the running velocity of the automatic guided vehicle 2 is about 1 meter per second, the distance between the last position of the laser scanner 10 and the present position of the laser scanner 10 is about 10 centimeters. The distance between the automatic guided vehicle 2 and the reflector, however, is generally 1 meter or more, so in a sense the laser scanner 10 continuously recognizes the reflectors. A change in the distance between the laser scanner 10 and the reflector caused by the movement of the automatic guided vehicle 2 over about 10 centimeters generally is equal to or less than a distance resolution for the laser scanner 10, and thus, with respect to the distance, almost the same results can be obtained within the effective range of values. In addition, if the distance between the laser scanner 10 and the reflector 16 is, for example, 1 meter and if the laser scanner 10 has moved 10 centimeters, the change in orientation is less than 6 degrees at most. In general, the distance between the laser scanner 10 and the reflector is greater than 1 meter and the change in orientation reaches a maximum value when the travelling direction of the automatic guided vehicle 2 is perpendicular to the position of the reflector. In general, however, the locational relationship between the travelling direction of the automatic guided vehicle 2 and the reflector is not limited to this angle, and the change in orientation during the next scanning will correspond to a relatively small angle. This is generally less than 6 degrees, as described above.

With these prerequisites assumed, a reflector that has almost the same distance to the laser scanner as the last recognized reflector and that is subjected to a small change in orientation may be assumed to be the same as the last recognized reflector. For example, in FIG. 7, a mask is used in which the allowable range of a change in the distance from the last recognized value is defined as $\Delta r$, and in which the change in angle is defined as $\Delta\theta$ ($\Delta\theta$ is fixed irrespective of distance(r)) or $\Delta\theta(r)$ ($\Delta\theta$ changes according to the distance between the laser scanner 10 and the reflector 16 and is, for example, inversely proportional to the distance, or $\Delta\theta$ is fixed as a decreasing function of the distance (r)), and a reflector is specified to be the same as the last reflector if a peak is recognized within this mask during the present scanning.

The automatic guided vehicle 2 travels about 10 centimeters during a single scanning, so in most cases, the last scanning and the present scanning recognize the same reflector. In these cases, by assuming a reflector that coincides with the last scanning within the mask for the distance and angle (orientation) to be the same as the last reflector, the reflector can easily be specified again.

If the last recognized reflector fails to be recognized during the present scanning, this reflector is assumed to have moved out of sight. There are two possible reasons for this, either the reflector is temporarily obstructed by a certain object, or it has literally moved out of sight due to the travelling of the automatic guided vehicle 2. In either case, a reflector that cannot be recognized during the present scanning is excluded from the processing as one that cannot be seen.

Figure 8:
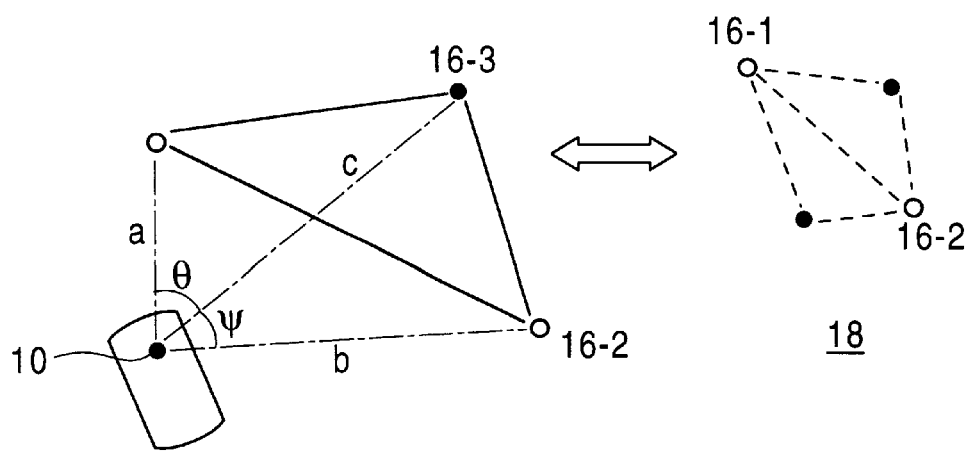
FIG. 8 is a characteristic diagram showing the specification of a new reflector according to the embodiment.

If the peak of a new reflector that was not recognized during the last scanning, the new peak is specified without temporarily determining the present position of the automatic guided vehicle 2. If the three reflectors have been recognized as shown in FIG. 3, the shape of the triangle composed of the three reflectors can be almost determined by measuring the distance between each of the reflectors and the laser scanner 10. Most of the reflectors were specified in the previous scanning and thus can easily be specified again, so there should be two or more specified reflectors existing for the new peak (the recognized value of the reflector) of the reflected light. Then, the shape of the triangle formed by these three reflectors is determined from the distances between each of the reflectors and the laser scanner, and the new peak is specified by referencing the reflector map 18. FIG. 8 shows this process wherein the reflectors 16-1 and 16-2 have been specified while the reflector 163 has been unspecified, wherein the distances between the reflectors 16-1 to 163 and the laser scanner 19 are respectively defined as (a), (b) and (c), and wherein the angles between the reflectors 16-1 and 16-2 and between the reflectors 16-2 and 16-3 are defined as $\theta$ and $\phi$, respectively. Then, the shape of the triangle formed by the reflectors 16-1 to 16-3 is automatically determined, and the unspecified reflector 16-3 can exist at only two points on the right of the reflector map 18. A point that coincides best with either of the two points may be specified as the reflector 16-3. In this manner, the recognized reflectors can be very easily specified without temporarily determining the present position of the automatic guided vehicle 2.

[Detection of Velocity and Angular Velocity]

It is well known that the present position and orientation of the automatic guided vehicle 2 can be determined by specifying three reflectors. This well-known method, however, has a prerequisite that the automatic guided vehicle 2 is stationary or that the present position recognizing section 14 receives information on the velocity and angular velocity of the vehicle body from the travel control section 12. Actually, the automatic guided vehicle 2 is travelling, so to improve the position recognition accuracy, it is not preferable to assume that the automatic guided vehicle 2 is stationary. If, for example, the automatic guided vehicle 2 travels 10 centimeters during a single scanning, a locational error of at most 10 centimeters occurs if the automatic guided vehicle 2 is presumably stationary. On the other hand, velocities and angular velocities determined by the sensor mounted on the automatic guided vehicle 2 are uncertain, and in particular, the detection results for the angular velocity are not reliable. In addition, the constant input of information on the velocity or angular velocity from the travel control section 12 to the present position recognizing section 14 increases the need to communicate within the automatic guided vehicle 2. Thus, the embodiment allows the present position recognizing section 14 to be independent of the travel control section 12 and recognize the present position without data from the travel control section 12. To achieve this end, the automatic guided vehicle 2 determines its own velocity and angular velocity (actually, the velocity and angular velocity of the frame 8 of the laser scanner 10). As a prerequisite for this, the embodiment eliminates the effect of delays from the point at which the laser scanner 10 recognizes the reflector 16 until the processing is ended.

The processing for the time delay is very simple. According to the embodiment, the travel control section 12 sends its timer signals to the present position recognizing section 14 at an appropriate time interval, and the present position recognizing section 14 compares its timer signal with the timer signal from the travel control section 12 to determine data required to convert its own time into the time at the travel control section 12. The most common cause of the difference between the times counted by the timers of the travel control section 12 and the present position recognizing section 14 is a difference in clock frequency. To execute, for example, primary correction, the travel control section 12 inputs times to the present position recognizing section 14 at a predetermined time interval, while the present position recognizing section 14 carries out correction by determining a proportional coefficient from the times counted by its timer during this interval.

Figure 9:
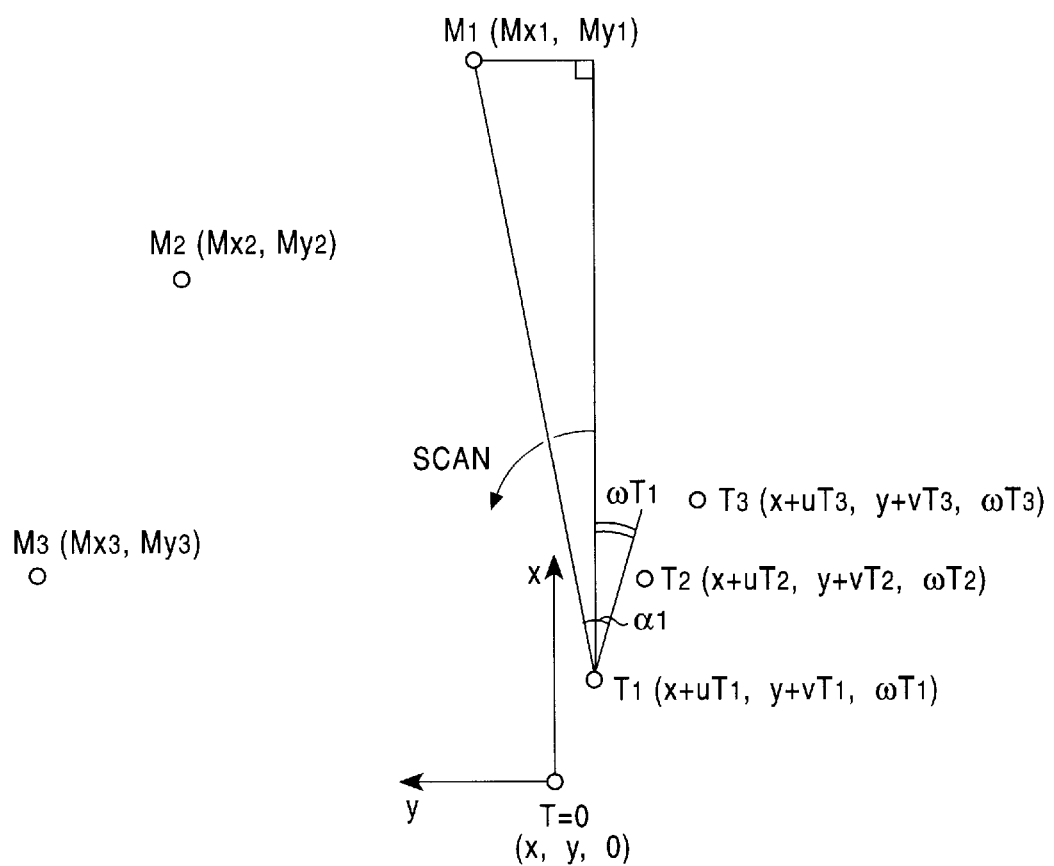
FIG. 9 is a characteristic diagram showing processing for the velocity and angular velocity of the automatic guided vehicle according to the embodiment.

The velocity and angular velocity are calculated as shown in FIG. 9. In this figure, the coordinates (x, y) and orientation of the automatic guided vehicle 2 at time T=0 are known from the results of the previous recognition, and the orientation is assumed herein to be 0 for simplification. During the present scanning, a reflector M1 is recognized at time T1, a reflector M2 is recognized at time T2, and a reflector M3 is recognized at time T3. The scanning is executed counterclockwise as shown in FIG. 9. The (x) and (y) coordinates of each reflector M1 to M3 are defined as Mxi, Myi (i=1 to 3), and the x-direction velocity, y-direction velocity, and angular velocity of the automatic guided vehicle 2 are defined as (u), (v), and (ω), respectively. Scanning is performed at intervals of approximately 0.1 second, and the velocities (u) and (v) and the angular velocity (ω) may be considered to be constant except in the case of spin turn of the vehicle. The orientation of the reflector M1 recognized at time T1 is defined as α1, the orientation of the reflector M2 at time T2 is defined as α2, and the orientation of the reflector M3 at time T3 is defined as α3. Then, the coordinates of the automatic guided vehicle 2 at time T1 and the reflector M1 can be used to constitute a right-angled triangle such as that shown in the figure, with the angle of one side of the triangle determined using α1+ωT1. In FIG. 9, (ω) is negative. Thus, using this right-angled triangle, one equation having (u), (v), and (ω) as unknowns is formulated. Where (x), (y), T1, Mx1, and My1 are knowns. One equation is established using the position or orientation of the automatic guided vehicle at time T2 and the position of the reflector M2, while one equation is established using the position or orientation of the automatic guided vehicle at time T3 and the position of the reflector M3. As a result, if the three reflectors are recognized, three equations including the three unknowns are established. The velocities (u) and (v), and angular velocity (ω) of the automatic guided vehicle 2 are determined from these simultaneous equations to calculate changes in position or orientation between the reference time T=0 and the present time T4, thereby enabling the orientation and position of the automatic guided vehicle 2 at an arbitrary time to be determined.

Figure 10:
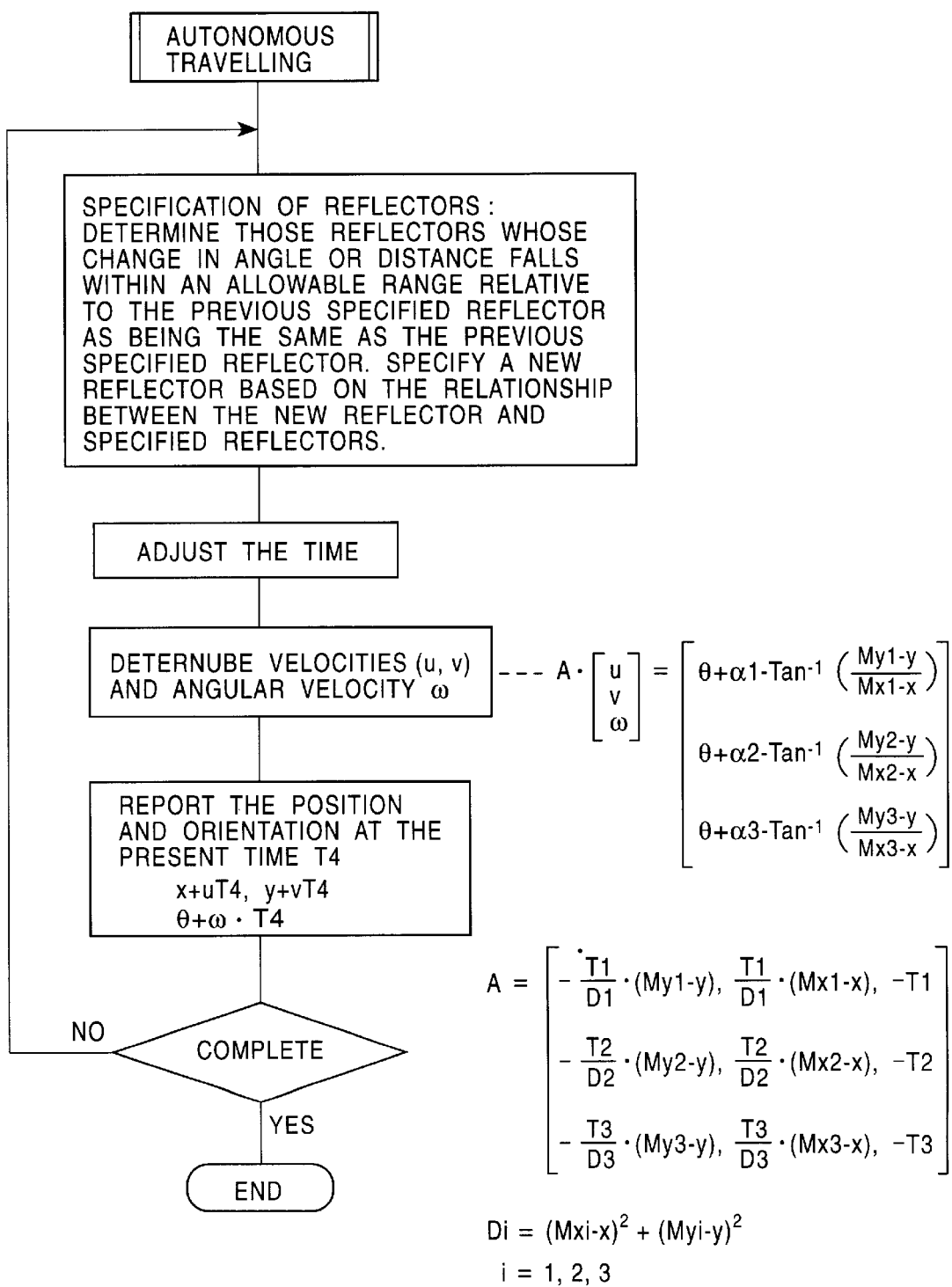
FIG. 10 is a flow chart showing the recognition of the present position during the autonomous travelling process according to the embodiment.

FIG. 10 shows the processing performed as shown in FIGS. 7 to 9 wherein the reflectors are specified during each scanning after the start of autonomous travelling. To specify the reflectors, a reflector whose change in distance or angle relative to the previous specified reflector falls within an allowable range is determined to be the same as the previous specified reflector. If any of the previous recognized reflectors cannot be recognized during the present scanning, it is assumed to have moved out of view, and if there is a new reflector, the method in FIG. 8 and the reflector map 18 are used to determine reflectors corresponding to the triangle formed by the two specified reflectors and the newly recognized reflector in order to specify this new reflector.

Next, at predetermined intervals, the present position recognizing section 14 adjusts its time to the time at the travel control section 12 so to enable the time at the travel control section 12 to be known. Then, the principle demonstrated in FIG. 9 is used to determine the velocities (u) and (v), and angular velocity (ω) of the automatic guided vehicle 2. If, for example, the relationship in FIG. 9 is solved taking into account the linear terms of the variation in the position or orientation of the automatic guided vehicle 2, the simultaneous equations shown on the left side of FIG. 10 can be obtained. Since these equations can be solved easily, the velocities (u) and (v), and angular velocity (ω) of the automatic guided vehicle 2 can be determined. It is well known that if four or more reflectors can be recognized, the problem is solved in such a way as to minimize the least square errors of the unknowns (u), (v), and (ω). This approach enables the velocity or angular velocity to be determined more accurately. Once the velocity or angular velocity of the automatic guided vehicle 2 has been determined, the position and orientation at time T=0 are known, the position at time T4 is x+uT4, y+vT4, and the orientation is θ+ωT4 if the orientation at the time T=0 is defined as θ. The present position recognizing section 14 inputs these data values to the travel control section 12 and can determine the present position and orientation of the automatic guided vehicle 2 without assuming the present position or receiving the velocity or angular velocity.

What is claimed is:

1. An automatic guided vehicle system comprising
   a large number of reflectors arranged along a traveling path;
   a laser scanner provided in an automatic guided vehicle to determine the orientation of each reflector by means of periodic scanning;
   a reflector map for indicating predetermined positions of the reflectors stored therein;
   a means for storing results of a specification of reflectors recognized on a previous scanning;
   a means for specifying reflectors recognized during a present scanning by determining a reflector located within a predetermined angle relative to the stored results of the previous scanning to be the same as the last recognized reflector; and
   a means for determining the present position of the automatic guided vehicle by comparing the results of the specified reflectors with the predetermined positions of the reflectors stored in the reflector map.

2. An automatic guided vehicle system as in claim 1, wherein said laser scanner determines the orientation of and the distance to the reflector, and in that said specifying means is configured to specify a newly appeared reflector using said reflector map and based on the distance relationship between the newly appeared reflector and the specified reflectors.

3. An automatic guided vehicle system as in claim 1, wherein the velocity and angular velocity of the automatic guided vehicle are determined from at least three specified reflectors, and in that the velocities and angular velocities determined from a previously recognized position until the present time are integrated to determine the present position and orientation.

* * * * *